(12) United States Patent
Huang et al.

(10) Patent No.: US 10,454,279 B2
(45) Date of Patent: Oct. 22, 2019

(54) POWER SYSTEM AND CONTROL METHOD THEREOF

(71) Applicant: DELTA ELECTRONICS, INC., Taoyuan (TW)

(72) Inventors: Jun-Lai Huang, Taoyuan (TW); Yun-Peng Dong, Taoyuan (TW); Gui-Hua Weng, Taoyuan (TW); Hao Lu, Taoyuan (TW); Hui Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 772 days.

(21) Appl. No.: 14/941,685

(22) Filed: Nov. 16, 2015

(65) Prior Publication Data
US 2016/0181814 A1 Jun. 23, 2016

(30) Foreign Application Priority Data
Dec. 18, 2014 (CN) .......................... 2014 1 0796570

(51) Int. Cl.
*H02J 4/00* (2006.01)
*G06F 1/26* (2006.01)

(52) U.S. Cl.
CPC ............... *H02J 4/00* (2013.01); *G06F 1/263* (2013.01)

(58) Field of Classification Search
CPC ..................................... H02J 4/00; G06F 1/26
USPC .......................................................... 307/24
See application file for complete search history.

(56) References Cited

U.S. PATENT DOCUMENTS

| 8,552,586 B2 | 10/2013 | Kinnard | |
|---|---|---|---|
| 2011/0191612 A1* | 8/2011 | Itakura | H02J 3/005 713/320 |
| 2012/0248894 A1* | 10/2012 | Sakuragi | H03M 11/22 307/115 |
| 2016/0018873 A1* | 1/2016 | Fernald | H04W 52/0229 713/323 |

FOREIGN PATENT DOCUMENTS

| CN | 1430322 A | 7/2003 |
|---|---|---|
| CN | 101217252 A | 7/2008 |
| CN | 101291116 A | 10/2008 |
| CN | 100463330 C | 2/2009 |
| CN | 201928185 U | 8/2011 |
| CN | 102522896 A | 6/2012 |
| CN | 103219904 A | 7/2013 |

(Continued)

*Primary Examiner* — Alfonso Perez Borroto
(74) *Attorney, Agent, or Firm* — CKC & Partners Co., LLC

(57) ABSTRACT

The present invention discloses a power system and a control method thereof. The power system includes a plurality of power devices and a physical wire, where each power device includes a signal pin, a power unit and a control unit. The physical wire is connected to the signal pin of each power device to constitute a synchronization signal line. The logic level of the synchronization signal line is based on the result of wired-AND logic operation according to logic levels of the signal pin of each power device. The control unit controls the signal pin's logic level based on an operating state of the power unit. When any one of the power devices is just turned on, its control unit adjusts an on/off state of the power unit according to the logic level of the synchronization signal line.

19 Claims, 4 Drawing Sheets

(56) References Cited

FOREIGN PATENT DOCUMENTS

| | | |
|---|---|---|
| CN | 103227465 A | 7/2013 |
| CN | 103280999 A | 9/2013 |
| CN | 102355126 B | 1/2014 |
| JP | H0795763 A | 4/1995 |
| JP | H1039936 A | 2/1998 |
| JP | 4609400 B2 | 1/2011 |
| JP | 2012060796 A | 3/2012 |
| TW | 200721647 A | 6/2007 |

* cited by examiner

POWER SYSTEM AND CONTROL METHOD THEREOF

RELATED APPLICATIONS

This application claims priority to China Application Serial Number 201410796570.6, filed Dec. 18, 2014, which is herein incorporated by reference.

BACKGROUND

Field of Invention

The present invention relates to a power system and a control method thereof.

Description of Related Art

Nowadays, a power system comprises multiple power devices whose outputs connected in parallel to constitute a redundant system. The redundant power system not only reduces the difficulty of a single power supply design, but also can reduce the risk of system crash due to a power failure.

In the redundant power system, a critical issue is how to control the start-up of the redundant power system. If one power device in the system tries to output voltage, its output current becomes large to go into an overloaded state, and a protection method must be implemented to protect the power device from damage due to overheating. There is a protection method that the power device enters a HICCUP mode during overload. A HICCUP mode, called an intermittent operation mode, means that the power device is turned on for a period of time (hereinafter referred to as $T_{on}$) and turned off for another period of time (hereinafter referred to as $T_{off}$), and then try to restart.

As more power devices in the redundant power system, $T_{on}$ should be longer than $T_{off}$, so that multiple power devices can synchronously output power at the same time to start the redundant power system up. However, such a method may decrease heat dissipation performance. When the power density is increased, the limitations of this design are more severe.

In the prior HICCUP mode, $T_{on}$ and $T_{off}$ are fixed, and the ratio of $T_{on}$ to $T_{off}$ is a duty, i.e., Duty=$T_{on}/T_{off}$. If the duty is too low ($T_{on} \ll T_{off}$), multiple power devices are in the HICCUP mode but fail to synchronize the output power at the same time. Thus, even if the total power of the system is less than the sum of the output powers of the two power devices, the voltage rail of the system still cannot be established and the redundant power system cannot be started up. If the duty is too high ($T_{on} \gg T_{off}$), it is easy to achieve synchronization of the multiple power devices. With more power devices in the system, the duty should be relatively high. However, too much Ton results in poor heat dissipation performance, and increased the current stress of hardware circuit, thereby increasing the difficulty of the design.

Moreover, certain power supply topologies, such as a LLC resonant converter, have strict requirements for overcurrent protection mode, and therefore the duty cannot be set too high.

Accordingly, there is a need for a power system and its control method that achieves start-up control of the power system with decreased complexity, cost and size.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure provides a power system and a control method thereof, to solve or circumvent aforesaid problems and disadvantages.

In one embodiment, a power system includes a plurality of power devices and a physical wire. The power devices are connected in parallel, and each of the power devices includes a signal pin, a power unit and a control unit. The control unit is electrically coupled with the signal pin, and the control unit is configured to control a logic level of the signal pin based on an operating state of the power unit. The physical wire is electrically coupled with the signal pin of each of the power devices and constituting a synchronization signal line, wherein a logic level of the synchronization signal line is resulted from an AND logic operation performed through the logic level of the signal pin of each of the power devices, and when any power device of the power devices is going to be started up, the control unit comprised in said any power device adjusts an on/off of the power unit comprised in said any power device according to the logic level of the synchronization signal line.

In another embodiment, a control method of a power system is provided, the power system includes a physical wire and a plurality of power devices connected in parallel, each of the power devices includes a signal pin and a power unit, the physical wire is electrically coupled with the signal pin of each of the power devices and constitutes a synchronization signal line, and the control method includes steps of, controlling a logic level of the signal pin based on an operating state of the power unit, wherein a logic level of the synchronization signal line is resulted from an AND logic operation performed through the logic level of the signal pin of each of the power devices, and when any power device of the power devices is going to be started up, adjusting an on/off of the power unit comprised in said any power device according to the logic level of the synchronization signal line.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
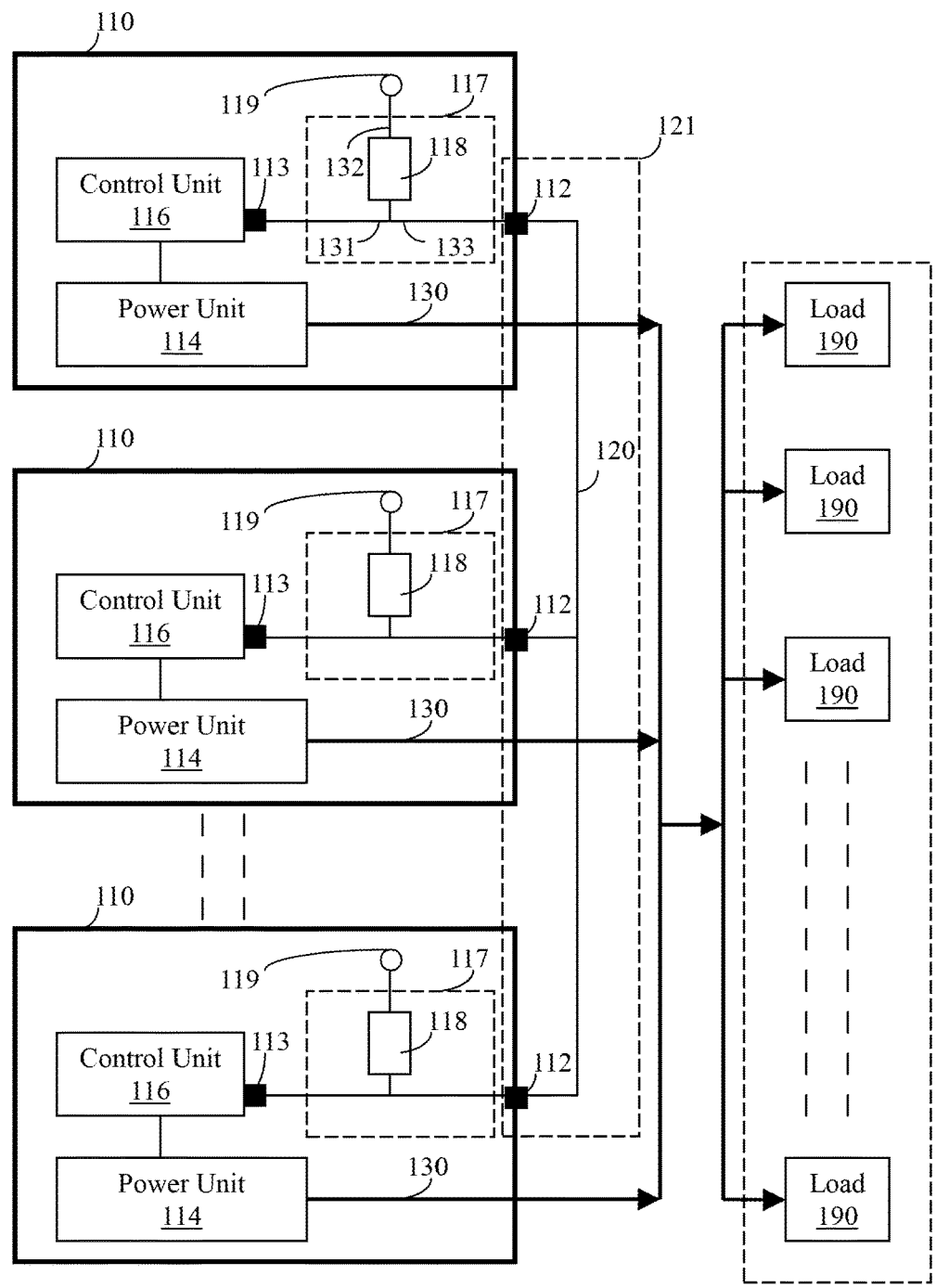
FIG. 1 is a block diagram of a power system according to one embodiment of the present disclosure.

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present invention. Also, like reference numerals and designations in the various drawings are used to indicate like elements/parts. Moreover, well-known structures and devices are schematically shown in order to simplify the drawing and to avoid unnecessary limitation to the claimed invention.

FIG. 1 is a block diagram of a power system according to one embodiment of the present disclosure. As illustrated in FIG. 1, the power system 100 includes a plurality of power devices 110 and a physical wire 120. The physical wire 120 is electrically coupled with a signal pin 112 of the respective power device 110 and constitutes a synchronization signal line 121. The connection between the signal pin 112 of the respective power device 110 and the synchronization signal line 121 is formed by the "wired-AND" design, and power devices 110 can change and read the logic level of its signal pin 112.

The power system 100 further includes power lines 130. The power lines 130 of the power devices 110 are connected in series or in parallel, so that the outputs of the power devices 110 can be connected in series or in parallel, and thus, the power system 100 constitutes a redundant system providing system power for a load 190.

In one embodiment, the physical wire 120 is a physically electrical cable, without adding any active or passive design as an auxiliary.

The power device 110 includes a signal pin 112, a power unit 114 and a control unit 116. The control unit 116 is electrically coupled with the power unit 114 and the signal pin 112. The control unit 116 controls the logic level of the signal pin 112 based on an operating state of the power unit 114. And when any of power devices 110 is going to be started up, its control unit 116 adjusts an on/off state of its power unit 114 according to the logic level of the synchronization signal line 121.

As the synchronization signal line 121 meets the "wired-AND" design, the logic level of the synchronization signal line 121 is resulted from an AND logic operation performed through the logic level 112 of the signal pin of each of the power devices 110. Specifically, when the signal pins 112 of the power devices 110 are all at a high level, the synchronization signal line 121 is at the high level; alternatively, when any of the signal pins 112 of power devices 110 is at a low level, the synchronization signal line 121 is at the low level.

The power device 110 further includes a pull-up circuit 117. The pull-up circuit 117 provides a valid identification for the logic level and can be disposed in or outside of the power device, but is not limited thereto. In the present embodiment, each power device 110 connected to the synchronization signal line 121 has the pull-up circuit 117 disposed therein. As shown in FIG. 1, the pull-up circuit 117 is electrically connected to the pin 113 of the control unit 116 and the signal pin 112. In one embodiment, the pull-up circuit 117 includes a pull-up resistor 118. The first terminal 131 of the pull-up resistor 118 is electrically coupled with the control unit 116, the second terminal 132 of the pull-up resistor 118 is electrically connected to a voltage source 119, and the third terminal 133 of the pull-up resistor 118 is electrically connected to the signal pin 112.

In one embodiment, when the control unit 116 of the power device 110 detects that its power unit 114 has an over-current and is in an over-current protection state; for example, the duration is longer than $T_{on}$, the power device 110 turns off its power unit 114. When the power unit 114 is turned off from on, the pin 113 is set at the low level by the control unit 116. The third terminal 133 of the pull-up resistor 118 is at the low level, and thus, the signal pin 112 is set at the low level.

When the control unit 116 detects that the power unit 114 has no over-current or has finished the over-current protection state; for example, the turn-off time is longer than $T_{off}$, or when the power unit 114 is going to be started up again, the pin 113 is set at a high resistance state by the control unit 116. The voltage source 119 is utilized through the pull-up resistor 118 so that the third terminal 133 of the pull-up resistor 118 outputs the high level, and the signal pin 112 is set at the high level. At this time, the control unit 116 of the power unit 114 going to be started up does not promptly enable its power unit 114 to output power, and all power devices 100 detect the state of the synchronization signal line 121.

When any one power device 110 is going to be started up, its control unit 116 firstly electrically releases the signal pin 112 and sets the pin 113 in the high resistance state, so that the signal pin 112 can be set at the high level by the pull-up circuit 117. Then, the control unit 116 of aforesaid power device 110 detects the logic level of the synchronization signal line 121. If the logic level of the synchronization signal line 121 is at the high level, which means that the other power devices 110 all finish the over-current protection state or are not in the over-current state, the power device 110 going to be started up can be started up and the corresponding power unit 114 can be controlled to output power. On the contrary, if the logic level of the synchronization signal line 121 is at the low level, which means that one or more power devices 110 in the power system 100 are still in the over-current protection state, the power device 110 going to be started up still in a waiting state and extends the turn-off time ($T_{off}$), the corresponding power unit 114 are turned off.

As mentioned above, the one or more power devices 100 in the waiting state can be synchronously started up when the logic level of the synchronization signal line 121 is at the high level. The plurality of power devices 100 may output power to a load (i.e., inverter) at the same time, thereby improving a current-balancing performance among the power devices 100 in the start-up phase and ensure that the voltage rail is established In one embodiment, when any power device 110 operates in a status (i.e., working state) followed after start-up, its control unit 116 controls the operating state of the power unit 114 and stops referring the logic level of the synchronization signal line 121. When detecting that the power unit 114 has an over-current and is in the over-current protection state, the control unit 116 turns off the power unit 114 and sets the signal pin 112 at the low level. When the power unit 114 is going to be started up again, the control unit 116 refers the logic level of the synchronization signal line 121 anew and performs above control strategy for synchronously starting up power devices in an iterative manner.

Figure 2:
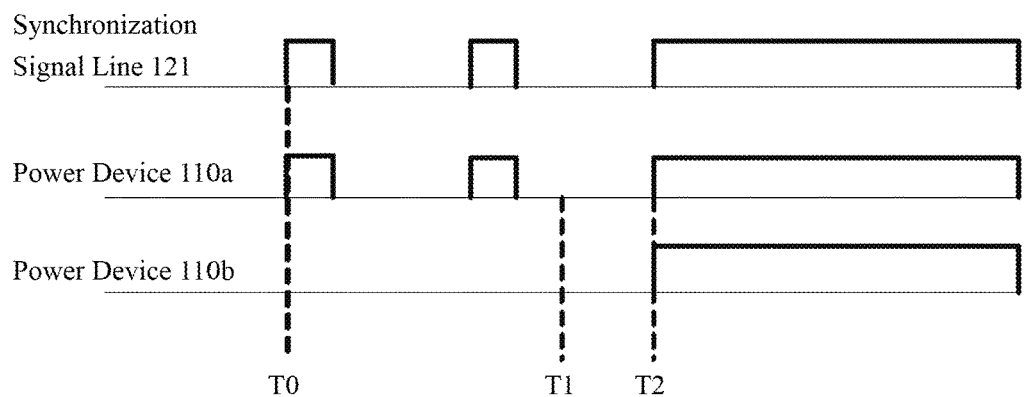
FIG. 2 is a schematic diagram of a control strategy according to one embodiment of the present disclosure.

FIG. 2 is a schematic diagram of a control strategy according to one embodiment of the present disclosure. In FIG. 2, the power device 110a and the power device 110b are substantially the same as any two power devices 110 in the power system 100.

The power device 110a is started up at the time T0 and tries to output power to drive the load; however, the total load of the power system 100 is greater than the rated power output of the power system 100, and therefore the power system 100 enters in the HICCUP mode. In the HICCUP mode, the power device 110a changes the logic level of the synchronization signal line 121 according to above control strategy. Once the synchronization signal line 121 is pulled to the low level by the power device 110a, the other power device (e.g., the power device 110b) connected to the synchronization signal line 121 detect that the power device 110a is in the over-current protection state. In FIG. 2, the power device 110b is going to be started up at the time T1. However, the synchronization signal line 121 is at the low level at the time T1, so the power device 110b cannot be started up and is set in the waiting state. At the time T2, the turn-off time of the power device 110a exceeds $T_{off}$ because of the over-current fault, and the power device 110a finishes the over-current protection state. The power device 110a is started up anew and electrically releases the synchronization signal line 121 at the time T2. Because the power devices 110a and 110b both electrically release the synchronization signal line 121, the logic level of the synchronization signal line 121 is transferred to the high level, the power device 110b is able to be started up. The both power devices 110a and 110b try to synchronously output power.

Figure 3:
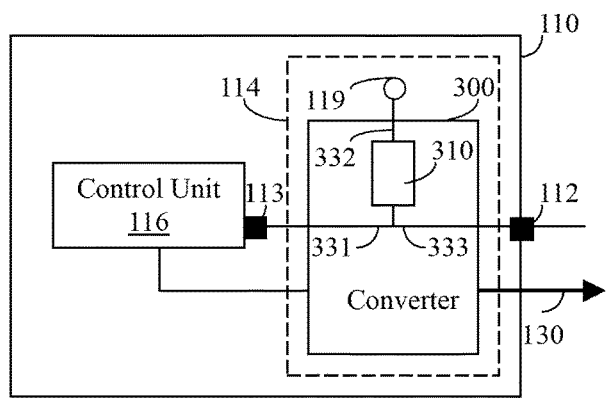
FIG. 3 is a block diagram of a power device according to one embodiment of the present disclosure.

FIG. 3 is a block diagram of a power device 110 according to one embodiment of the present disclosure. As illustrated in FIG. 1, the power unit 114 of the power device 110 includes at least one converter 300, and a resistor 310 of the converter 300 serves as a pull-up resistor. The first terminal 331 of the resistor 310 is electrically coupled with the control unit 116, the second terminal 332 of the resistor 310 is electrically connected to the voltage source 119, and the third terminal 333 of the resistor 310 is electrically connected to the signal pin 112. The control unit 116 has the pin 113, and the pin 113 is electrically connected to the first terminal 331 of the resistor 310. When the pin 113 is set at the low level by the control unit 116, the third terminal 333 of the resistor 310 is at the low level, and the signal pin 112 is at the low level. When the pin 113 is set in the high resistance state by the control unit 116, the voltage source 119 is utilized through the resistor 310 so that the third terminal 333 of the resistor 310 can output voltage at the high level, and the signal pin 112 is set at the high level.

Figure 4:
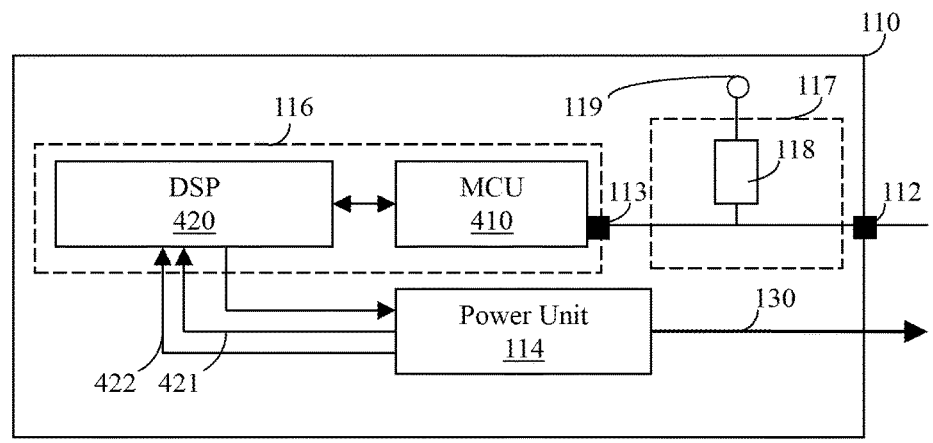
FIG. 4 is a block diagram of a power device according to another embodiment of the present disclosure.

FIG. 4 is a block diagram of a power device 110 according to another embodiment of the present disclosure. As illustrated in FIG. 4, the control unit 116 of the power device 110 includes a micro-controller (MCU) 410 and a digital signal processor (DSP) 420. The micro-controller 410 is electrically connected to the signal pin 112. The digital signal processor 420 detects variables, such as an output voltage, an output current or the like, that represent the operating state of the power unit 114, and outputs signals 421 and 422 according to the operating state of the power unit 114; the micro-controller 410 receives the signals 421 and 422 and sets the logic level of the pin 113 based on the signals 421 and 422 to control the logic level of the signal pin 112, thereby controlling the logic level of the synchronization signal line 121. Moreover, when the power device 110 is going to be started up, the micro-controller 410 monitors the logic level of the synchronization signal line 121 by the signal pin 112. The micro-controller 410 outputs a signal to the digital signal processor 420 based on the logic level of the synchronization signal line 121, so as to control whether the power unit 114 outputs power. When the micro-controller 410 detects that the synchronization signal line 121 is at the logic level, the micro-controller 410 outputs pulse modulation signals to the power unit 114, so as to control the operation of the power unit 114. When the micro-controller 410 detects that the synchronization signal line 121 is at the low level, the micro-controller 410 does not output pulse modulation signals or disable the power unit 114, so that the power unit 114 stops outputting power.

The present disclosure further includes a strategy of controlling a soft-start up time of the power devices, thereby may improving a current-balancing performance and accomplishing better synchronization among the power devices.

In soft-start up control, the digital signal processor 420 may include a soft starting control unit. In order to realize the soft start, the soft starting control unit detects an output voltage of the power unit 114 and compares the output voltage with an output voltage reference, and its inside adjuster can adjust the output voltage of the power unit 114 to track the output voltage reference. The specific control circuits and control methods are not detailed herein. Those with ordinary skill in the art may flexibly design the circuitry of the soft-start up control unit depending on the desired application.

In one embodiment, the value of the output voltage reference is a numerical value that is increased gradually. In a period of time, the value of the output voltage reference is gradually increased from a first initial value to a first setting value. Due to the adjusting function of the soft-start up control, the value of the output voltage outputted by the power unit 114 is correspondingly increased from a second initial value to a second setting value, in which the second initial value corresponds to the first initial value, and the second setting value corresponds to the first setting value, thereby achieving the soft-start up of the power device. Therefore, the soft-start up time of the power device is defined as the duration that the value of the output voltage is increased from the second initial value to the second setting value.

Figure 5:
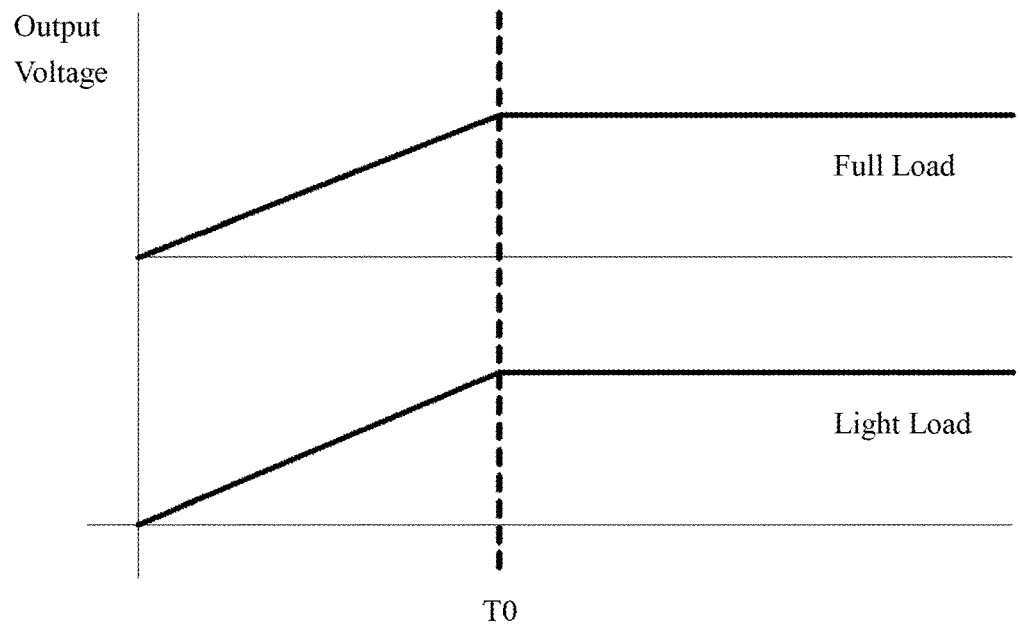
FIG. 5 is a schematic waveform illustrating a soft starting phase of a conventional power device.

FIG. 5 is a schematic waveform illustrating a soft-start up of a prior power device. No matter whether the load current is in a full load or a light load, the soft-start up time of the power device is constant (e.g., duration from 0 to time T0). Although the multi-power devices are synchronously started up, their start times are not exactly the same Therefore, the output voltages of the power devices are different. For example, one power device is started up early, its output voltage is relatively high, and a larger load current is born. While another power device is started up late, its output voltage is relatively low and a smaller load current is born. Therefore, the currents of different power devices are unbalanced. The larger the time interval is, the poor the current-balancing performance is. Because the soft-start up time of the power device is constant, the current-unbalancing effect always exists during the soft-start up, one or more power devices may even enter the over-current protection state and stopping output power.

Figure 6:
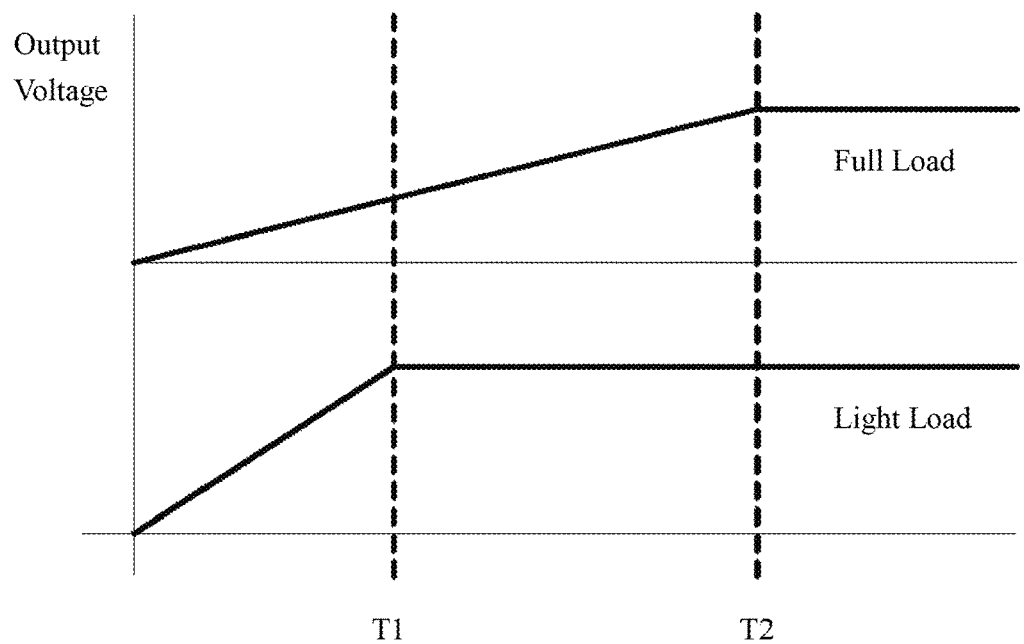
FIG. 6 is a schematic waveform illustrating a soft starting phase of an improved power device according to one embodiment of the present disclosure.

FIG. 6 is a schematic waveform illustrating a soft-start up of an power device according to one embodiment of the present disclosure. The power device 110 dynamically adjusts the soft-start up time (e.g., duration from 0 to time T1, and duration from 0 to time T2, etc.) based on the output current. In one embodiment, the control unit 116 of the power device 110 receives the output current from the power unit 114, and dynamically adjusts the soft-start up time of the power unit 114 based on the output current, where the value of the output current is in direct proportion to the soft-start up time. The larger the value of the output current is, the longer the rise time is. Conversely, the smaller the value of the output current is, the shorter the rise time is.

In one embodiment, the digital signal processor 420 controls the rising slope of the output voltage outputted by the power unit 114, to realize the soft-start up. The digital signal processor 420 detects the output current of the power unit 114, and adjusts the output voltage reference based on the output current, to dynamically adjust the output voltage of the power unit 114. When the output current is relatively high, the rising slope of the value of the output voltage reference is decreased, the rising slope of the output voltage of the power unit 114 is decreased correspondingly, and thus, soft-start up time is increased. When the output current is relatively low, the rising slope of the value of the output voltage reference is increased, the rising slope of the output voltage of the power unit 114 is increased correspondingly, and thus, soft-start up time is decreased. Therefore, even if an initial voltage difference between two power devices 110 exists, this voltage difference is eliminated in the soft-start up time, thereby improving the current-balancing performance between the power devices 110, preventing the power device from being in the over-current protection state in the soft-start up and avoiding faults of starting up the power system.

Figure 7:
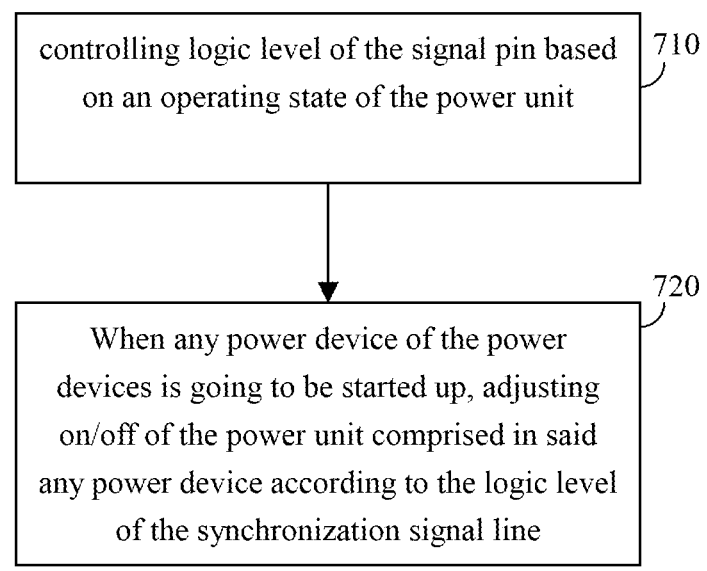
FIG. 7 is a control method of a power system according to one embodiment of the present disclosure.

FIG. 7 is a control method 700 of a power system 100 according to one embodiment of the present disclosure. For example, the control method 700 can be performed through the control unit 116 shown in FIGS. 1, 3, and 4. The steps of the control method 700 are not recited in the sequence in which the steps are performed. That is, unless the sequence of the steps is expressly indicated, the sequence of the steps is interchangeable, and all or part of the steps may be simultaneously, partially simultaneously, or sequentially performed. It should be noted that those implements to perform the steps are disclosed in above embodiments and, thus, are not repeated herein.

As illustrated in FIG. 7, the control method 700 includes steps 710 and 720. At step 710, the control units control logic levels of the signal pins respectively based on operating states of the power unit, wherein a logic level of the synchronization signal line is resulted from an AND logic operation performed through the logic level of the signal pin of each of the power devices. That is, when the pluralities of the signal pins all are at the high level, the synchronization signal line is at the high level; alternatively, when any of the plurality of the signal pins is at the low level, the synchronization signal line is at the low level. At step 720, when any one of the power devices is going to be started up, it is in said any power device that the control unit controls on/off of the power unit according to the logic level of the synchronization signal line.

In one embodiment, the control method 700 further includes: when said any power device is going to be started up, firstly setting the signal pin at the high level, and then detecting the logic level of the synchronization signal line. when the synchronization signal line is at the low level, turning off the power unit; and when the synchronization signal line is at the high level, outputting power by the power unit.

In one embodiment, the control method 700 further includes: when said any power device operates in a status followed after start-up, controlling an operating state of the power unit and stopping referring the logic level of the synchronization signal line.

In one embodiment, the control method 700 further includes: when said any power device detects that the power unit has an over-current and the power unit is turned off from on, setting the signal pin at the low level and the synchronization signal line is at the low level. And when the power unit is going to be started up again, setting the signal pin at a high level.

In one embodiment, the pull-up resistor is electrically coupled with a pin of the control unit, when setting the pin at the low level, the signal pin is at the low level; alternatively, when setting the pin in a high resistance state, the signal pin is at the low level.

Moreover, the present disclosure also includes the strategy of controlling the a soft-start up time of the power devices, and the control method 700 further includes steps of receiving an output current from the power unit, and dynamically adjusting the soft-start up time based on the output current value, wherein the output current is in direct proportion to the soft-start up time.

Alternatively, the control method 700 further includes steps of receiving an output current from the power unit, and dynamically adjusting a rising slope of an output voltage outputted by the power unit, wherein the output current is in inverse proportion to the rising slope of the output voltage.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A power system, comprising:
    a plurality of power devices connected in parallel, and each of the power devices comprising:
        a signal pin;
        a power unit; and
        a control unit electrically coupled with the signal pin, and the control unit configured to control a logic level of the signal pin based on an operating state of the power unit; and
    a physical wire electrically coupled with the signal pins of the power devices to form a synchronization signal line, a logic level of the synchronization signal line is resulted from an AND logic operation performed through the logic level of the signal pins of the power devices,
    and when any power device of the power devices is going to be started up, the control unit comprised in said any power device controls on/off of the power unit comprised in said any power device according to the logic level of the synchronization signal line,
    wherein the control unit comprised in said any power device detects the synchronization signal line to determine the logic level of the synchronization signal line, and
    when the control unit comprised in said any power device determines the logic level is at a low level, the control unit turn off the power unit in said any power device according to the low level, and
    when the control unit comprised in said any power device determines the logic level is at a high level, the control unit turn on the power unit in said any power device according to the high level.

2. The power system of claim 1, wherein when said any power device is going to be started up, the control unit comprised in said any power device firstly sets the signal pin at a high level, and then the control unit detects the logic level of the synchronization signal line.

3. The power system of claim 1, wherein when said any power device operates in a status followed after start-up, in said any power device, the control unit of said any power device controls an operating state of the power unit and stops referring the logic level of the synchronization signal line.

4. The power system of claim 1, wherein in said any power device, when the control unit of said any power device detects that the power unit has an over-current and the power unit is turned off from on, the control unit sets the signal pin at a low level.

5. The power system of claim 1, wherein each of the power devices further comprises:
a pull-up circuit having a pull-up resistor, and the pull-up resistor having a first terminal electrically coupled with the control unit, a second terminal electrically connected to a voltage source, and a third terminal electrically connected to the signal pin.

6. The power system of claim 5, wherein the control unit has a pin, and the pin is electrically connected to the first terminal of the pull-up resistor; when the control unit sets the pin at a low level, the third terminal of the pull-up resistor is at the low level, and the signal pin is at the low level;
when the control unit sets the pin in a high resistance state, the third terminal of the pull-up resistor is at a high level, and the signal pin is at the high level.

7. The power system of claim 1, wherein the control unit of each of the power devices comprises:
a digital signal processor configured to output a control signal according to the operating state of the power unit; and
a micro-controller electrically connected to the digital signal processor and the signal pin, and the micro-controller configured to receive the control signal so as to control the logic level of the signal pin according to the control signal.

8. The power system of claim 7, wherein the micro-controller monitors the logic level of the synchronization signal line by the signal pin, and control whether the power unit outputs power according to the logic level of the synchronization signal line.

9. The power system of claim 1, wherein in each of the power devices, the control unit receives an output current from the power unit, and dynamically adjusts a soft-start up time of the power unit according to the output current, wherein the output current is in direct proportion to the soft-start up time.

10. The power system of claim 9, wherein in each of the power devices, the control unit receives an output current from the power unit, and dynamically adjusts a rising slope of an output voltage outputted by the power unit during the soft-start up according to the output current, wherein the output current is in inverse proportion to the rising slope of the output voltage.

11. A control method of a power system, the power system comprising a physical wire and a plurality of power devices connected in parallel, each of the power devices comprises a signal pin and a power unit, the physical wire electrically coupled with the signal pins of the power devices and to form a synchronization signal line, and the control method comprising:
controlling a logic level of the signal pin based on an operating state of the power unit, wherein a logic level of the synchronization signal line is resulted from an AND logic operation performed through the logic level of the signal pin of each of the power devices; and
when any power device of the power devices is going to be started up, adjusting on/off of the power unit comprised in said any power device according to the logic level of the synchronization signal line, further comprising:
detecting the synchronization signal line, by a control unit comprised in said any power device, to determine the logic level of the synchronization signal line; and
turning off the power unit in said any power device according to a low level by the control unit, when the control unit comprised in said any power device determines the logic level is at the low level, and
turning on the power unit in said any power device according to a high level when the control unit comprised in said any power device determines the logic level is at the high level.

12. The control method of claim 11, further comprising:
When said any power device is going to be started up, in said any power device, firstly setting the signal pin at the high level, and then detecting the logic level of the synchronization signal line.

13. The control method of claim 11, further comprising:
when said any power device operates in a status followed after start-up, controlling an operating state of the power unit in said any power device and stopping referring the logic level of the synchronization signal line.

14. The control method of claim 11, further comprising:
in said any power device, when the control unit detects that the power unit has an over-current and the power unit is turned off from on, setting the signal pin at a low level, the synchronization signal line is at the low level.

15. The control method of claim 11, wherein each of the power devices further comprises a pull-up circuit, the pull-up circuit has a pull-up resistor, the pull-up resistor has a first terminal electrically coupled with a pin of a control unit, a second terminal electrically connected to a voltage source, and a third terminal electrically connected to the signal pin, and the control method further comprises:
when setting the pin at a low level, the signal pin is at the low level; or when setting the pin in a high resistance state, making the third terminal of the pull-up resistor at a high level, and the signal pin is at the high level.

16. The control method of claim 11, further comprising:
outputting a control signal according to the operating state of the power unit; and
receiving the control signal and controlling the logic level of the signal pin according to the control signal.

17. The control method of claim 16, further comprising:
monitoring the logic level of the synchronization signal line by the signal pin; and
controlling whether the power unit outputs power according to the logic level of the synchronization signal line.

18. The control method of claim 11, further comprising:
receiving an output current from the power unit, and dynamically adjusting a soft-start up time of the power unit according to the output current, wherein the output current is in direct proportion to the soft-start up time.

19. The control method of claim 18, further comprising:
receiving an output current value from the power unit, and dynamically adjusting a rising slope of an output voltage outputted by the power unit during the soft-start up according to the output current value, wherein the output current is in inverse proportion to the rising slope of the output voltage.

* * * * *